(12) United States Patent
Fedyk

(10) Patent No.: US 12,506,794 B2
(45) Date of Patent: Dec. 23, 2025

(54) CREATING A MULTI-SCREEN VIDEO CONFERENCE AT A LOCATION

(71) Applicant: Google LLC, Mountain View, CA (US)

(72) Inventor: Ryan Fedyk, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 271 days.

(21) Appl. No.: 18/198,840

(22) Filed: May 17, 2023

(65) Prior Publication Data

US 2024/0388613 A1 Nov. 21, 2024

(51) Int. Cl.
*H04L 65/403* (2022.01)
*G06F 3/16* (2006.01)
*H04N 5/262* (2006.01)

(52) U.S. Cl.
CPC ............ *H04L 65/403* (2013.01); *G06F 3/165* (2013.01); *H04N 5/2624* (2013.01)

(58) Field of Classification Search
None
See application file for complete search history.

(56) References Cited

U.S. PATENT DOCUMENTS

| | | | | |
|---|---|---|---|---|
| 2004/0246121 | A1* | 12/2004 | Beyda | H04L 12/1827 340/506 |
| 2007/0070177 | A1* | 3/2007 | Christensen | H04N 7/15 348/E7.083 |
| 2010/0225736 | A1* | 9/2010 | King | H04N 7/152 348/14.09 |
| 2022/0303502 | A1* | 9/2022 | Fisher | H04L 67/104 |

FOREIGN PATENT DOCUMENTS

| | | |
|---|---|---|
| CN | 101427232 A | 5/2009 |
| EP | 2437491 A1 | 4/2012 |
| WO | 2021119090 A1 | 6/2021 |

OTHER PUBLICATIONS

International Search Report and Written Opinion for International Application No. PCT/US2024/029524, mailed Sep. 3, 2024, 14 pages.

* cited by examiner

*Primary Examiner* — Hemant S Patel
(74) *Attorney, Agent, or Firm* — Lowenstein Sandler LLP

(57) ABSTRACT

Systems and methods for configuring an arrangement of client devices to create a multi-screen video conference in a meeting room. A server can assign each client device of a first set of client devices to a respective client device of a second set of client devices. The server can provide, for presentation on each of the second set of client devices, a respective user interface comprising a region to display a video stream received from the corresponding assigned client device. The server can detect audio input from a first client device of the first set of client devices, wherein the first client device is assigned to a second client device of the second set of client devices. The server can then enable a speaker coupled to the second client device and disable a speaker coupled to a third client device of the second set of client devices.

17 Claims, 9 Drawing Sheets

CREATING A MULTI-SCREEN VIDEO CONFERENCE AT A LOCATION

TECHNICAL FIELD

Aspects and implementations of the present disclosure relate to creating a multi-screen video conference at a location.

BACKGROUND

Video conferences can take place between multiple participants via a video conference platform. A video conference platform includes tools that allow multiple client devices to be connected over a network and share each other's audio (e.g., voice of a user recorded via a microphone of a client device) and/or video stream (e.g., a video captured by a camera of a client device, or video captured from a screen image of the client device) for efficient communication. To this end, the video conference platform can provide a user interface that includes multiple regions to display the video stream of each participating client device.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes assigning each client device of a first set of client devices to a respective client device of a second set of client devices. The method can provide, for presentation on each of the second set of client devices, a respective user interface comprising a region to display a video stream received from the corresponding assigned client device of the first set of client devices. The method can detect audio input from a first client device of the first set of client devices, wherein the first client device is assigned to a second client device of the second set of client devices. The method can then enable a first speaker coupled to the second client device and disable a second speaker coupled to a third client device of the second set of client devices.

A further aspect of the disclosure provides a method that includes detecting that a user of a first remote client device of a plurality of remote client devices is joining a video conference. The method can assign the first remote client device to a first in-room client device of a plurality of in-room client devices located in a meeting room and cause presentation of a first user interface on the first in-room client device. The first user interface can display a video stream generated by the first remote client device without displaying a video stream generated by any other remote client device of the plurality of remote client devices. The method can further cause presentation of a second user interface on the first remote client device. The second user interface can display a video stream generated by the first in-room client device and a video stream generated by each other remote client device of the plurality of remote client devices, without displaying a video stream generated by any other in-room client device of the plurality of in-room client devices.

A further aspect of the disclosure provides a system comprising: a memory; and a processing device, coupled to the memory, the processing device to perform a method according to any aspect or implementation described herein.

A further aspect of the disclosure provides a non-transitory computer-readable medium comprising instructions that, responsive to execution by a processing device, cause the processing device to perform operations according to any aspect or implementation described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
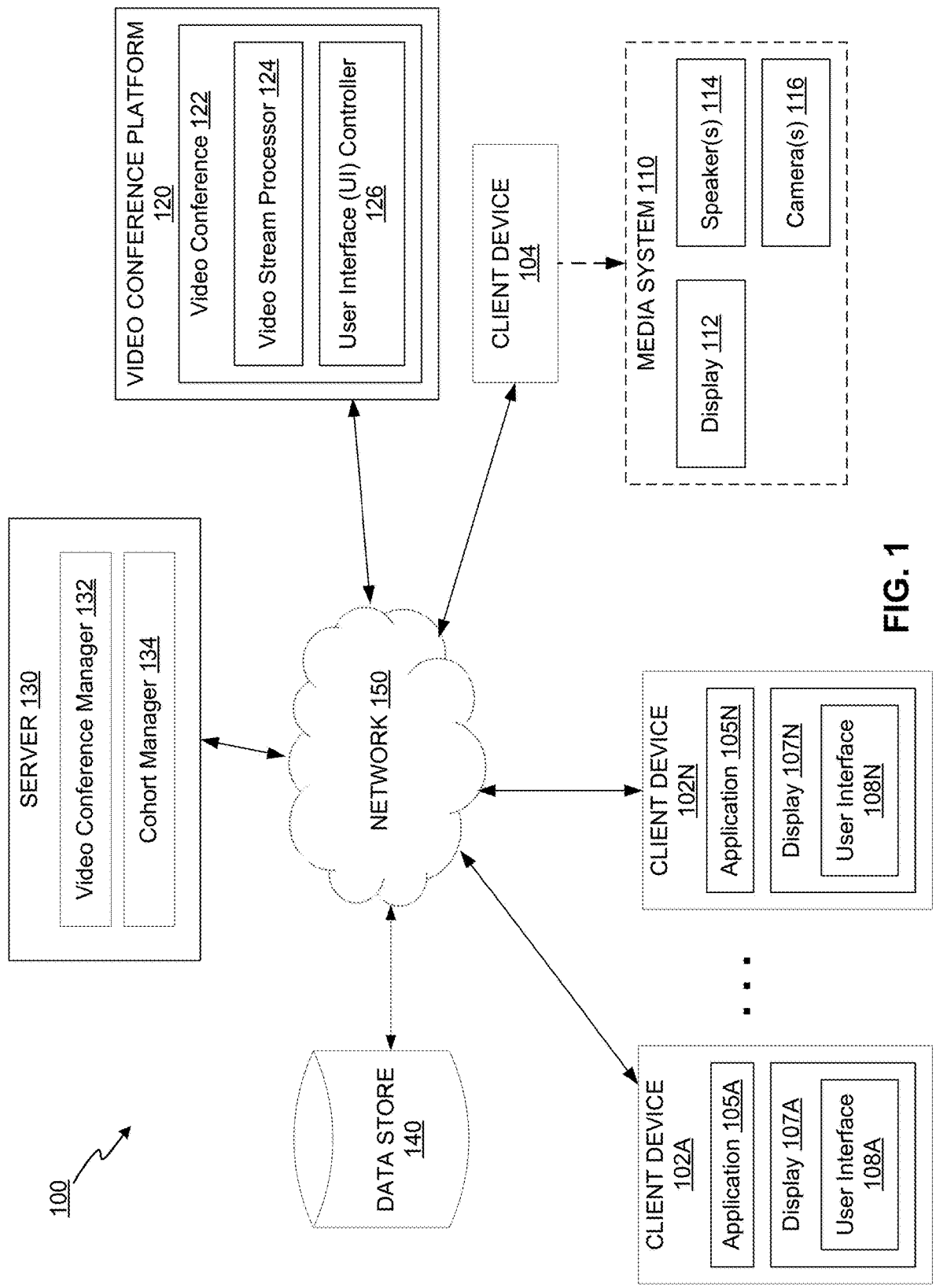
FIG. 1 illustrates an example system architecture, in accordance with implementations of the present disclosure.

Aspects of the present disclosure relate to creating a multi-screen video conference at a location. A video conference platform can enable video-based conferences between multiple participants via respective client devices that are connected over a network and share each other's audio (e.g., voice of a user recorded via a microphone of a client device) and/or video streams (e.g., a video captured by a camera of a client device) during a video conference. In some instances, a video conference platform can enable a significant number of client devices (e.g., up to one hundred or more client devices) to be connected via the video conference.

A participant of a video conference can speak (e.g., present on a topic) to the other participants of the video conference. Some existing video conference platforms can provide a user interface (UI) to each client device connected to the video conference, where the UI displays the video streams shared over the network in a set of regions in the UI. For example, the video stream of a participant who is speaking to the other participants in the video conference can be displayed in a designated region in the UI of the video conference platform.

In some instances, the participants can participate in a hybrid event. A hybrid event combines an in-room event with a virtual online component (one or more participants joining remotely via, for example, a video conference platform). The in-room event can include a set of participants (referred to as "in-room participants") physically present at a particular location, such as, for example, a meeting room, a venue, an office, etc. The virtual online component can include one or more participants joining remotely (referred to as "remote participants") via, for example, the video conference platform. During the hybrid event, the in-room participants can lose spatial coherence with the remote participants. For example, all or a subset of the remote participants can be shown on the UI of a single client device. As such, hybrid events can reduce the natural experience of being in a meeting room and can create an inequity between participants by undermining the reason many in-room participants came to the meeting room in the first place. Furthermore, remote participants may not be well represented in meeting room and may find it difficult to engage with the in-room participants at certain times.

Implementations of the present disclosure address the above and other deficiencies by providing systems and methods for configuring an arrangement of client devices to create a multi-screen video conference in a location (hereafter a "meeting room"). In particular, during a hybrid meeting, a set of client devices (referred to as "in-room client devices") can be set up in the meeting room that includes a set of in-room participants. The in-room client devices can be placed in a spatial arrangement, such as in an arc on a table. Remote participants can join the hybrid meeting using their respective client devices (referred to as "remote client devices"). In response to each remote participant joining the hybrid meeting (e.g., joining a video conference via a video conference application), a video conference server can assign (referred to as "pinned") each participant's remote client device to an in-room client device located at the meeting room. As such, each remote participant can be displayed on a user interface of the pinned in-room client device. When a remote participant speaks, the video conference server can enable the speaker(s) coupled to the in-room client device corresponding to the speaking participant, while disabling the speaker(s) coupled to one or more of the other in-room client devices. In some implementations, in addition to enabling and disabling respective speakers, the video conference server can also enable and/or disable one or more respective microphones (e.g., when a remote participant speaks, the video conference server can also enable the microphone coupled to the in-room client device corresponding to the speaking participant, while disabling the microphones coupled to the other in-room client devices). By enabling and disabling the appropriate speakers (and/or microphones), the audio stream from the speaking remote participant can be output from their pinned in-room client device, thus allowing the in-room participants to naturally direct their attention to the remote active speaker and giving the remote active speaker a sense of representation in the meeting room. The video conference server can automatically switch (enable and/or disable) the speakers and/or microphones coupled to the in-room client devices based on which remote participant is speaking (or based on whether an in-room participant is speaking).

Aspects of the present disclosure provide technical advantages over previous solutions. Aspects of the present disclosure can provide additional functionality to a video conference platform by providing a system capable of connecting remote user devices to respective in-room user devices during a video conference. This functionally can enable managing interactions between the multiple in-room devices by automatically switching (enabling and disabling) speakers and/or microphones based on the speaking participant. By managing these interactions, the system prevents distributive noise in the meeting room, such as echoes and audio feedback, while providing the in-room participants with a natural spatial experience provided by the spatial arrangement of the in-room client devices and the selective use of speakers and/or microphones based on the speaking participant. For example, the in-room participants are able to naturally direct their attention to the active speaker regardless of whether the active speaker is in the meeting room or remote. This also allows the remote participants to be well represented in the meeting room and improves their ability to engage with the in-room participants, thus improving the user experience.

FIG. 1 illustrates an example system architecture 100, in accordance with implementations of the present disclosure. System architecture 100 (also referred to as "system" herein) includes client devices 102A-102N, one or more client devices 104, video conference platform 120, server 130, and data store 140, each connected to network 150.

In some implementations, network 150 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 140 is a persistent storage that is capable of storing data as well as data structures to tag, organize, and index the data. A data item can include audio data and/or video stream data, in accordance with implementations described herein. Data store 140 can be hosted by one or more storage devices, such as main memory, magnetic or optical storage-based disks, tapes or hard drives, NAS, SAN, and so forth. In some implementations, data store 140 can be a network-attached file server, while in other implementations data store 140 can be some other type of persistent storage such as an object-oriented database, a relational database, and so forth, that can be hosted by video conference platform 120 or one or more different machines (e.g., the server 130) coupled to the video conference platform 120 via network 150. In some implementations, data store 140 can store portions of audio and video streams received from the client devices 102A-102N for the video conference platform 120. Moreover, the data store 140 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents can be shared with users of the client devices 102A-102N and/or concurrently editable by the users.

Video conference platform 120 can enable users of client devices 102A-102N and/or client device(s) 104 to connect with each other via a video conference (e.g., a video conference 122). A video conference refers to a real-time communication session such as a video conference call, also known as a video-based call or video chat, in which participants can connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. Video conference platform 120 can allow a user to join and participate in a video conference call with other users of the platform. Implementations of the present disclosure can be implemented with any number of participants connecting via the video conference (e.g, up to one hundred or more).

In some implementations, video conference manager 122 includes video stream processor 124 and user interface (UI) controller 126. Video stream processor 124 can receive video streams from the client devices (e.g., from client devices 102A-102N and/or 104). Video stream processor 124 can determine visual items for presentation in the UI (e.g., the UIs 108-108N) during a video conference. Each visual item can correspond to a video stream from a client device (e.g, the video stream pertaining to one or more participants of the video conference). In some implementations, the video stream processor 124 can receive audio streams associated with the video streams from the client devices (e.g., from an audiovisual component of the client devices 102A-102N). Once the video stream processor has determined visual items for presentation in the UI, the video stream processor 124 can notify the UI controller 126 of the determined visual items. The visual items for presentation can be determined based on current speaker, current presenter, order of the participants joining the video conference, list of participants (e.g., alphabetical), etc.

UI controller 126 can provide the UI for a video conference. The UI can include multiple regions. Each region can display a video stream pertaining to one or more participant of the video conference. UI controller 126 can control which video stream is to be displayed by providing a command to the client devices that indicates which video stream is to be displayed in which region of the UI (along with the received video and audio streams being provided to the client devices). For example, in response to being notified of the determined visual items for presentation in the UI 108A-108N, UI controller 126 can transmit a command causing each determined visual item to be displayed in a region of the UI and/or rearranged in the UI.

Client devices 102A-102N can each include computing devices such as personal computers (PCs), laptops, mobile phones, smart phones, tablet computers, netbook computers, network-connected televisions, etc. In some implementations, client devices 102A-102N can also be referred to as "user devices." Each client device 102A-102N can include an audiovisual component that can generate audio and video data to be streamed to video conference platform 120. In some implementations, the audiovisual component can be coupled to a device (e.g., a microphone) to capture an audio signal representing speech of a user and generate audio data (e.g, an audio file or audio stream) based on the captured audio signal. The audiovisual component can include another device (e.g., a speaker) to output audio data to a user associated with a particular client device 102A-102N. In some implementations, the audiovisual component can also include an image capture device (e.g., a camera) to capture images and generate video data (e.g., a video stream) of the captured data of the captured images. In some implementations, the audiovisual component can be an internal device of client device 102A-N (e.g., a build-in hardware component such as speakers and/or a build in microphones), an external device connected to client device 102A-N (e.g., external speakers, headset, earbuds, USB microphone, etc.), an external device connected to an intermediary device (e.g., an amplifier or an audio modifier also connected to client device 102A-N), or any combination thereof.

In some implementations, video conference platform 120 is coupled, via network 150, with one or more client devices 104 that are each associated with a physical conference or meeting room. Client device(s) 104 can include or be coupled to a media system 110 that can comprise one or more display devices 112, one or more speakers 114 and one or more cameras 116. Display device 112 can be, for example, a smart display or a non-smart display (e.g., a display that is not itself configured to connect to network 150). Users that are physically present in the room can use media system 110 rather than their own devices (e.g., client devices 102A-102N) to participate in a video conference, which can include other remote users. For example, the users in the room that participate in the video conference can control the display 112 to show a slide presentation or watch slide presentations of other participants. Sound and/or camera control can similarly be performed. Similar to client devices 102A-102N, client device(s) 104 can generate audio and video data to be streamed to video conference platform 120 (e.g., using one or more microphones, speakers 114 and cameras 116). As will be explained in detail below, client device 102A-102N, 104 can include in-room client device and/or remote client devices.

Each client device 102A-102N or 104 can include client application 105A-N, which can be a mobile application, a desktop application, a web browser, etc. In some implementations, client application 105A-N can present, on a display device 107-107N of client device 102A-102N, a user interface (UI) (e.g., a UI of the UIs 108A-108N) for users to access video conference platform 120. For example, a user of client device 102A can join and participate in a video conference via a UI 108A presented on the display device 107A by client application 105A. A user can also present a document to participants of the video conference via each of the UIs 108A-108N. Each of the UIs 108A-108N can include multiple regions to present visual items corresponding to video streams of the client devices 102A-102N provided to the server 130 for the video conference.

In some implementations, server 130 includes a video conference manager 132. Video conference manager 132 can be configured to manage a video conference between multiple users of video conference platform 120. In some implementations, video conference manager 132 can provide the UIs 108A-108N to each client device to enable users to watch and listen to each other during a video conference. Video conference manager 132 can also collect and provide data associated with the video conference to each participant of the video conference. In some implementations, video conference manager 132 can provide the UIs 108A-108N for presentation by client application 105A-N. For example, the UIs 108A-108N can be displayed on a display device 107A-107N by client application 105A-N executing on the operating system of the client device 102A-102N or the client device 104. In some implementations, the video conference manager 132 can determine visual items for presentation in the UI 108A-108N during a video conference. A visual item can refer to a UI element that occupies a particular region in the UI and is dedicated to presenting a video stream from a respective client device. Such a video stream can depict, for example, a user of the respective client device while the user is participating in the video conference (e.g., speaking, presenting, listening to other participants, watching other participants, etc., at particular moments during the video conference), a physical conference or meeting room (e.g., with one or more participants present), a document or media content (e.g., video content, one or more images, etc.) being presented during the video conference, etc.

In some implementations, server 130 includes cohort manager 134. Cohort manager 134 can be configured to manage connections between each remote client device and an in-room client device assigned to a respective remote participant. The remote client device can be a client device 102A-102N that the remote participant uses while participating in a video conference from a remote location. In some implementations, cohort manager 134 can assign (pin) one or more remote client devices to an in-room client device. Using the remote client device, the remote participant can view the meeting room and other remote participants on the UI 108A-N displayed by display 107A-N of the client device. Cohort manager 134 can further manage interactions between multiple in-room client devices positioned in a meeting room. As discussed in more detail below with respect to FIGS. 2 and 3, cohort manager 134 can enable/disable microphones and/or speakers coupled to certain in-room client devices based on certain parameters, such as, for example, which participant is speaking. In some implementations, application 105A-N can include cohort manager 134 (not shown), which can operate as a standalone program, or in conjunction with server 130 and/or video conference platform 120. Further details with respect to the managing connections and interactions between remote client devices and/or in-room client devices are described below.

As described previously, an audiovisual component of each client device can capture images and generate video data (e.g., a video stream) of the captured data of the captured images. In some implementations, the client devices 102A-102N and/or client device(s) 104 can transmit the generated video stream to video conference manager 132. The audiovisual component of each client device can also capture an audio signal representing speech of a user and generate audio data (e.g., an audio file or audio stream) based on the captured audio signal. In some implementations, the client devices 102A-102N and/or client device(s) 104 can transmit the generated audio data to video conference manager 132.

In some implementations, video conference platform 120 and/or server 130 can be one or more computing devices computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to enable a user to connect with other users via a video conference. Video conference platform 120 can also include a website (e.g., a webpage) or application back-end software that can be used to enable a user to connect with other users via the video conference.

It should be noted that in some other implementations, the functions of server 130 and/or video conference platform 120 can be provided by a fewer number of machines. For example, in some implementations, server 130 can be integrated into a single machine, while in other implementations, server 130 can be integrated into multiple machines. In addition, in some implementations, server 130 can be integrated into video conference platform 120.

In general, functions described in implementations as being performed by video conference platform 120 and/or server 130 can also be performed by the client devices 102A-N and/or client device(s) 104 in other implementations, if appropriate. In addition, the functionality attributed to a particular component can be performed by different or multiple components operating together. Video conference platform 120 and/or server 130 can also be accessed as a service provided to other systems or devices through appropriate application programming interfaces, and thus is not limited to use in websites.

Although implementations of the disclosure are discussed in terms of video conference platform 120 and users of video conference platform 120 participating in a video conference, implementations can also be generally applied to any type of telephone call or conference call between users. Implementations of the disclosure are not limited to video conference platforms that provide video conference tools to users.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of the video conference platform 120.

In situations in which the systems discussed here collect personal information about users, or can make use of personal information, the users can be provided with an opportunity to control whether video conference platform 120 collects user information (e.g., information about a user's social network, social actions or activities, profession, a user's preferences, or a user's current location), or to control whether and/or how to receive content from the server 130 that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the video conference platform 120 and/or server 130.

Figure 2:
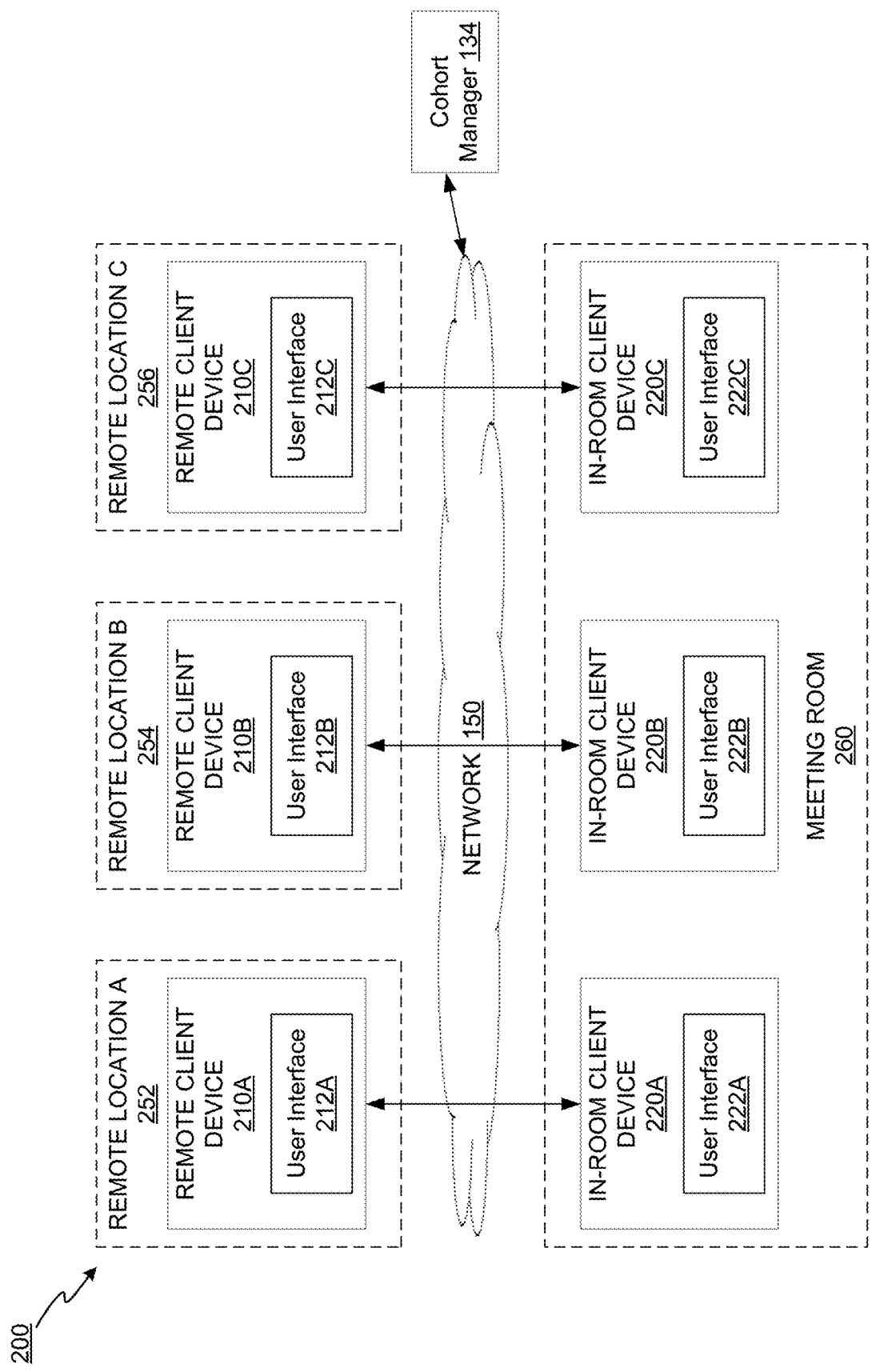
FIG. 2 is a block diagram illustrating an example configuration of a set of remote client devices and a set of in-room client devices participating in a hybrid event.

FIG. 2 is a block diagram illustrating an example configuration 200 of a set of remote client devices and a set of in-room client devices participating in a hybrid event, in accordance with some implementations. As shown, configuration 200 includes remote client devices 210A-210C, in-room client devices 220A-220C, network 150, and cohort manager 134. Each in-room device 220A-220C can be similar to or the same as client device 102A-N, 104, and can perform similar or the same functionality. Each in-room client device 220A-220C can include a respective user interface (e.g., user interface 222A-222C). Each in-room client device 220A-220C can be physically located in in-room location 260. In-room location 260 can be a location where a live or in-room meeting is being held. For example, location 260 can include meeting room where one or more participants of the hybrid event are physically located.

Remote client device 210A-210C can be similar to or the same as client device 102A-102N, 104, and can perform similar or the same functionality. Each remote client device 210A-210C can include a respective user interface (e.g., user interface 212A-212C). Each remote client device 210A-210C can be located in a respective remote location 252-256. In particular, remote client device 210A can be located in remote location A 252, remote client device 210B can be located in remote location B 254, and remote device 210C can be located in remote location C 256. A remote location can include any location where a user of the respective remote device is located, and from which the user uses the remote client device to virtually connect to in-room location 260 of the hybrid event. In some implementations, during set-up of the in-room client device, a user can be provided with a button to classify a client device as an in-room client device. For example, in response to running the video conference application on a client device, a call set-up room can be presented on the UI. The call set-up room (or green room) can provide a user of the video conference applicant with tools to set their conference related preferences prior to joining or starting the video conference. The call set-up room can include a button that, once selected, can indicate to cohort manager 134 that this client device is an in-room client device.

Cohort manager 134 can use user input (e.g., selection of the above button) to collect information about in-room client devices 220A, 220B and 220C, and assign (referred to as pinning) each remote client device 210A-210C to a respective in-room client device 220A-220C. For example, remote client device 210A can be pinned to in-room client device 220A, remote client device 210B can be pinned to in-room client device 220B, and remote client device 210C can be pinned to in-room client device 220C. Accordingly, audio and visual streams received from a remote client device 210A-210C can be presented (e.g., output) by the respective pinned in-room client device 220A-220C, and vice versa. For example, the video stream captured by remote client device 210A (e.g., of a participant operating remote client device 210A) can be displayed by in-room client device 220A (via UI 222A), and the video stream captured by in-room client device 220A (e.g., of the participants in the in-room location 260) can be displayed by remote client device 210A (via UI 222A). This allows each remote participant to have spatial representation during the hybrid meeting. For example, when the remote participant speaks, the in-room participants focus on the correlating in-room device, thus providing a feeling of receiving natural attention. As will be explained in greater detail below, in some implementations, audio streams received from one client device (e.g., in-room client device 220A) can be output on multiple other client devices (e.g., remote client devices 210A-210C).

Cohort manager 134 can select an in-room device to pin to a remote client device based on one or more pinning factors. A pinning factor can include display device pixel size, user selection, random selection, chronological selection, etc. In one example, when a remote participant joins the video conference, cohort manager 134 can randomly assign a connected in-room client device such as an in-room client device communicating with video conference platform 120 and/or cohort manager 134 of server 130 via network 150. In another example, once an in-room client device sends a request to video conference platform 120 and/or cohort manager 134 to join the video conference, the in-room client device can be listed in a queue. In response to a remote client device joining the video conference, the next available in-room client device, based on the queue order, can be pinned to the remote client device. In another example, a user of an in-room client device can select which remote client device to pin to. In another example, the user of a remote client device can select which available in-room client device to pin to. In particular, two or more in-room client devices can be made available to joining remote participants. The remote participant, upon joining the video conference or in a call set-up room, can be presented with a listing of available in-room client devices. In some implementations, the remote participant can also be presented with the current view generated by the respective in-room client device. The remote participant can then select one of the available in-room client device to pin to.

In some implementations, there may be more remote participants than available in-room client devices 220A-220C for one-on-one pinning. In such implementations, two or more remote participants can be presented on one in-room client device. In some implementations, the above discussed methods can be used to pin two or more remote client devices 210A-210C to an in-room client device 220A-220C. In some implementations, cohort manager 134 can pin one or more remote client devices 210A-210C to an in-room client device 220A-220C based on the pixel size (e.g., screen size) or resolution of the display device (e.g., display device 107A-107N of FIG. 1). In an illustrative example, three remote client devices (e.g., remote client devices 210A-210C) can join a video conference having only two in-room client devices available for pinning (e.g., in-room client device 220A-220B). Cohort manager 134 can determine that in-room client device 220A has a display resolution of 1080p while client device 220B has a display resolution of 720p. Thus, cohort manager 134 can pin two remote client devices (e.g., remote client devices 210A-210B) to the in-room client device having the larger display device (e.g., in-room client device 220A) while pinning remote client device 210C to the in-room client device having the smaller display device (e.g., in-room client device 220C).

In some implementations, cohort manager 134 can manage audio streams sent and received by in-room client device 220A-220C and/or remote client device 210A-210C. In particular, cohort manager 134 can automatically enable and/or disable one or more microphones coupled to remote client device 210A-C and/or in-room client devices 220A-C based on which remote or in-room participant is speaking at a given time.

In some implementations, cohort manager 134 can manage the microphones by enabling and/or disabling particular microphones coupled to each remote client device 210A-210C. When detecting that an in-room participant is speaking, cohort manager 134 can disable the microphones coupled to each remote client device 210A-210. For example, in response to detecting that one or more participants of in-room location 260 are speaking, cohort manager 134 can disable the microphone coupled to remote client device 210A-210C. This can prevent background noise from remote locations 252-256 being output to in-room location 260, or to other remote locations.

In some implementations, when an in-room participant is speaking, cohort manager 134 can enable a microphone coupled to a single in-room client device, while disabling the respective microphones coupled to the remaining in-room client devices. The audio stream received by the enabled microphone can be presented (e.g., output) to each remote client device 210A-210C. In some implementations, cohort manager 134 can select which in-room client device 220A-220C to use based on which remote participant spoke last. In some implementations, cohort manager 134 can select which in-room client device 220A-220C to use based on which in-room client device 220A-220C is closest to the active speaker at the in-room location 260. For example, in response to detecting that a participant is speaking at in-room location 260, cohort manager 134 can sample the audio stream obtained by each in-room client device 220A-220C, and select, for transmission to remote client devices 210A-210C, the loudest audio stream, the audio stream having the best quality (e.g., clearest audio stream, sharpest audio stream, audio stream with the least noise, etc.), etc.

In some implementations, to detect which participant is speaking, cohort manager 134 can use active speaker detection technology. Active speaker detection technology can use software-based methods and/or hardware-based methods to determine whether audio signals received by a client device (e.g., in-room client devices 220A-220C and/or remote client devices 210A-210C) correlate to a human speech (e.g., a participant speaking). In one illustrative example, active speaker detection technology can receive audio signals via one or more microphones coupled to a client device, provide the audio signals as input data to one or more trained machine learning models configured to detect human speech, and receive output data from the one or more machine learning models. The output data can be indicative of whether the audio data relates to human speech or other, non-human sounds. In other implementations, other active speaker technologies can be used.

In some implementations, responsive to detecting that a remote participant is speaking cohort manager 134 can enable the microphone coupled to the remote client device of the speaking participant and enable the speaker coupled to the pinned in-room client device 220A-220C. During this time, the respective speakers coupled to the remaining in-room client devices 220A-220C can be disabled. This enables the in-room participants to receive the audio stream from the in-room client device 220A-220C presenting the active speaker, thus allowing the in-room participants to naturally direct their attention to the remote active speaker, and giving the remote active speaker a sense of representation.

In some implementations, cohort manager 134 can hide workspace notifications generated on in-room client device 220A-220C. For example, an in-room client device can belong to one of the in-room participants. While the in-room client device is presenting the video conference, cohort manager 134 can hide or disable workspace notifications, such as pop-up windows related to email notifications, chat notifications, etc. This allows the in-room participant to keep personal and/or confidential information private during the video conference. In one illustrative example, cohort manager 134 (or video conference manager 132) can present the video conference on the entire display area (e.g., full screen mode) of the display device of in-room client device 220A-220C, and in response to in-room client device 220A-220C receiving a workspace notification, cohort manager 134 can intercept the workspace notification and prevent the workspace notification from overlapping the UI of the video conference.

In some implementations, cohort manger 134 can use echo cancellation technologies and/or noise filtering technologies during the video conference to prevent participants from experiencing echo noise, background noise, etc. Echo cancellation is the process of cancelling echo signals that bounce back from one or more speakers to a microphone. Echo cancellation can prevent a speaker from hearing themselves echoing back in a transmission delay. Echo cancellation technologies can further remove signal background noise produced by one or more in-room client devices.

Figure 3:
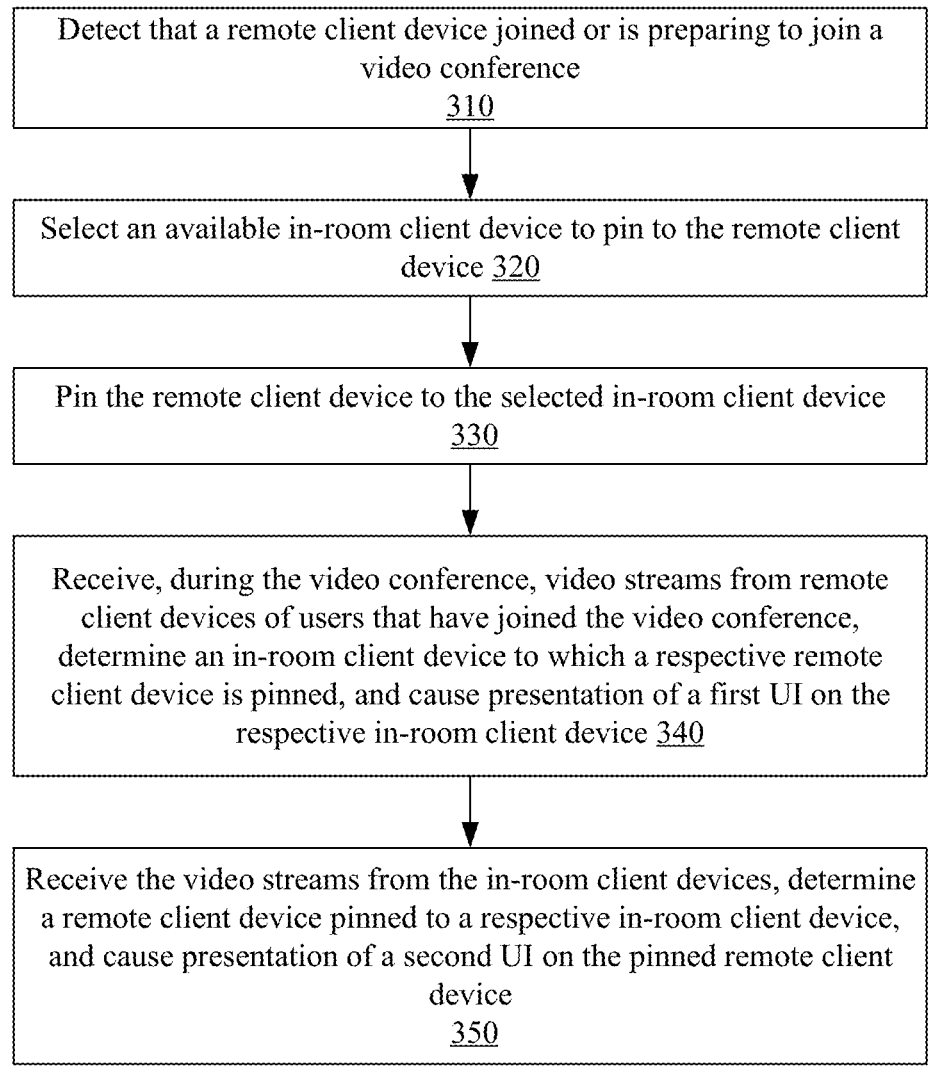
FIG. 3 depicts a flow diagram of a method for pinning a remote client device to an in-room client device during a video conference, in accordance with implementations of the present disclosure.

FIG. 3 depicts a flow diagram of a method 300 for pinning a remote client device to an in-room client device during a video conference, in accordance with implementations of the present disclosure. Method 300 can be performed by processing logic that can include hardware (circuitry, dedicated logic, etc.), software (e.g., instructions run on a processing device), or a combination thereof. In some implementations, some or all the operations of method 300 can be performed by one or more components of system 100 of FIG. 1 (e.g., client device 102A-102N, 104, remote client device 210A-210C, in-room client device 220A-220C, video conference platform 120, and/or server 130).

For simplicity of explanation, method 300 of this disclosure is depicted and described as a series of acts. However, acts in accordance with this disclosure can occur in various orders and/or concurrently, and with other acts not presented and described herein. Furthermore, not all illustrated acts can be required to implement the method 300 in accordance with the disclosed subject matter. In addition, those skilled in the art will understand and appreciate that the method 300 could alternatively be represented as a series of interrelated states via a state diagram or events. Additionally, it should be appreciated that the method 300 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At operation 310, processing logic detects that a remote client device joined or is preparing to join (e.g., accessed the call set-up room) a video conference. In some implementations, the processing logic can detect that the remote client device is executing a video conference application. In some implementations, the remote client device can be client device 102A-102N, 104 or remote client device 210A-210C and the video conference application can be application 105A-N. In some implementations, the processing logic can present, on the remote client device, a call set-up room. For example, the user of the remote client device can receive a notification (e.g., a pop-up window) indicating that a video conference has begun or is scheduled to begin in a certain time and, responsive to the user selecting a button to access the video conference, the processing logic can provide a video conference UI including the call set-up room.

At operation 320, the processing logic selects an available in-room client device to pin to the remote client device. The processing logic can select the in-room client device while the remote client device user is in the call set-up room or after the user joins the video conference. The processing logic can select an in-room client device using one or more pinning factors. In some implementations, the processing logic can select the available in-room client device using a listing or a queue maintained by cohort manager 134. For example, the processing logic can select the next available in-room client device in a queue of available in-room client devices. In some implementations, where each available in-room client device is pinned to other remote client devices, the processing logic can select an in-room client device to display multiple remote participants using, for example, the pixel or resolutions size of the in-room client devices.

In some implementations, the processing logic can select the in-room client device based on user input received from the remote client device. For example, in the call set-up room, the user can be presented with a listing of available in-room client devices to pin to. The processing logic can then receive a user selection of one of the in-room client devices.

At operation 330, the processing logic pins the remote client device to the selected in-room client device.

At operation 340, the processing logic receives, during the video conference, video streams from remote client devices of users that have joined the video conference, determines an in-room client device to which a respective remote client device is pinned, and causes presentation of a first UI on the respective in-room client device. The first UI displays a video stream generated by the pinned remote client device without displaying video streams generated by other remote client devices or other in-room client devices. In some embodiments, the processing logic sends, to the respective in-room client device, only the video stream received from the pinned remote client device (and optionally the audio stream received from the pinned remote client device as discussed in more details herein). In addition, during the video conference, the in-room client devices can generate video streams based on captured images (e.g., including images of the in-room participants).

At operation 350, the processing logic receives the video streams from the in-room client devices, determines a remote client device pinned to a respective in-room client device, and causes presentation of a second UI on the pinned remote client device. The second UI displays the video stream generated by the in-room client device and the video streams generated by other remote client devices, but not the video streams generated by other in-room client devices. In some implementations, the processing logic sends, to the pinned remote client device, only the video stream received from the respective in-room client device (and optionally the audio stream received from the respective in-room client device as discussed in more details herein) and the video streams received from the other remote client devices (and optionally one or more audio streams received from one or more other remote client devices as discussed in more details herein).

In some implementations, processing logic can send configuration data to a remote client device and a respective in-room client device. The configuration data can enable the remote client device to send video steams and/or audio streams directly to each other, without the video steams and/or audio streams being processed by server 130 and/or video conference platform 120. The configuration data can include a device identifier for each of the remote client device and the in-room client device, one or more Internet Protocol (IP) address, one or more media access control addresses, etc. In some implementations, the configuration data can include identification data of another server device to be used to facilitate communication between the remote client device and a respective in-room client device. This would allow server 130 of offload network traffic and decease possible latency.

Figure 4:
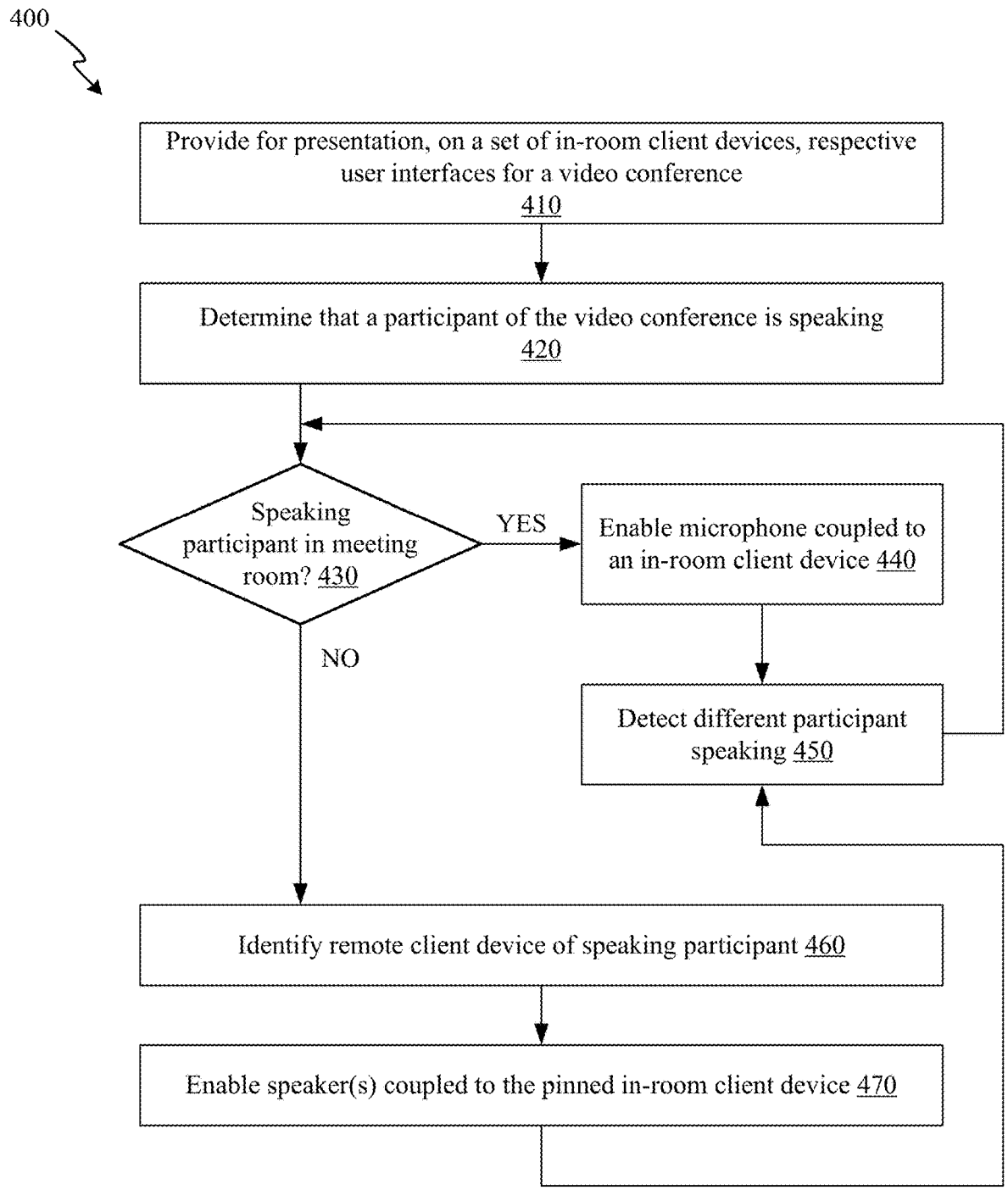
FIG. 4 depicts a flow diagram of a method for switching between in-room client device during a video conference, in accordance with implementations of the present disclosure.

FIG. 4 depicts a flow diagram of a method 400 for switching between in-room client devices during a video conference, in accordance with implementations of the present disclosure. Method 400 can be performed by processing logic that can include hardware (circuitry, dedicated logic, etc.), software (e.g., instructions run on a processing device), or a combination thereof. In some implementations, some or all the operations of method 400 can be performed by one or more components of system 100 of FIG. 1 (e.g., client device 102A-102N, 104, remote client device 210A-210C, in-room client device 220A-220C, video conference platform 120, and/or server 130).

For simplicity of explanation, method 400 of this disclosure is depicted and described as a series of acts. However, acts in accordance with this disclosure can occur in various orders and/or concurrently, and with other acts not presented and described herein. Furthermore, not all illustrated acts can be required to implement the method 400 in accordance with the disclosed subject matter. In addition, those skilled in the art will understand and appreciate that the method 300 could alternatively be represented as a series of interrelated states via a state diagram or events. Additionally, it should be appreciated that the method 400 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At operation 410, processing logic provides for presentation, on a set of in-room client devices, respective user interfaces (e.g., user interface 108A) for a video conference. In some implementations, the user interfaces can each include a region to display a visual item, where the visual item corresponds to a video stream from a respective remote client device of a set of participants to the video conference. In some implementations, one or more of the user interfaces can include a set of regions to display a set of visual items, where each visual item corresponds to one of a set of video streams from a set of remote client devices. In some implementations, a video stream can correspond to a series of images captured by a camera of a client device and subsequently encoded for transmission over a network in accordance with, for example, the H.264 standard.

At operation 420, processing logic determines that a participant of the video conference is speaking. For example, the processing logic can use active speaker detection technology to detect an audio stream from a participant of the video conference.

At operation 430, processing logic determines whether the speaking participant is in the meeting room. For example, the processing logic can determine whether the audio steam is received from a remote client device. If not, processing device can decide that the speaking participant is in the meeting room and proceed to operation 440. If the audio steam is received from a remote client device, processing logic can determine that the speaking participant is not in the meeting room (e.g., is in a remote location), and proceed to operation 460. In another example, the processing logic can determine whether the audio stream is being detected using a microphone coupled to one of the in-room client devices or using a microphone coupled to a remote client device. Responsive to determining that the audio streams are being detected using the microphone coupled to one of the in-room client devices, the processing logic proceeds to operation 440. Responsive to determining that the audio streams are being detected using the microphone coupled to one of the remote client devices, the processing logic proceeds to operation 460.

At operation 440, processing logic enables the microphone coupled to one of the in-room client devices. In some implementations, the processing logic can select which in-room client device to use based on which in-room client device is closest to the active speaker. For example, the processing logic can sample the audio stream obtained by each in-room client device, and select, for transmission to the remote client devices, the loudest audio stream, the audio stream having the best quality etc. During operation 440, processing logic can also disable the speakers coupled to the remote client devices. By disabling the speakers, processing logic can prevent audio feedback or echo noises interrupting the video conference.

At operation 450, processing logic detects a different participant speaking. The processing logic can then proceed to operation 430 to determine whether the new speaking participant is in the meeting room.

At operation 460, in response to determining that the speaking participant is not in the meeting room, processing logic identifies the remote client device of the speaking participant.

At operation 470, processing logic enables the speaker(s) coupled to the in-room client device pinned to the identified remote client device. The processing logic can further disable (if enabled) the speakers and/or microphones of coupled to the remaining in-room client device(s). In some implementations, the processing logic can further enable the microphone coupled to the in-room client device pinned to the identified remote client device. This allows audio from the meeting room to be received by the in-room device pinned to the remote (speaking) participant. Processing logic can detect a different participant speaking at operation 450.

Figure 5:
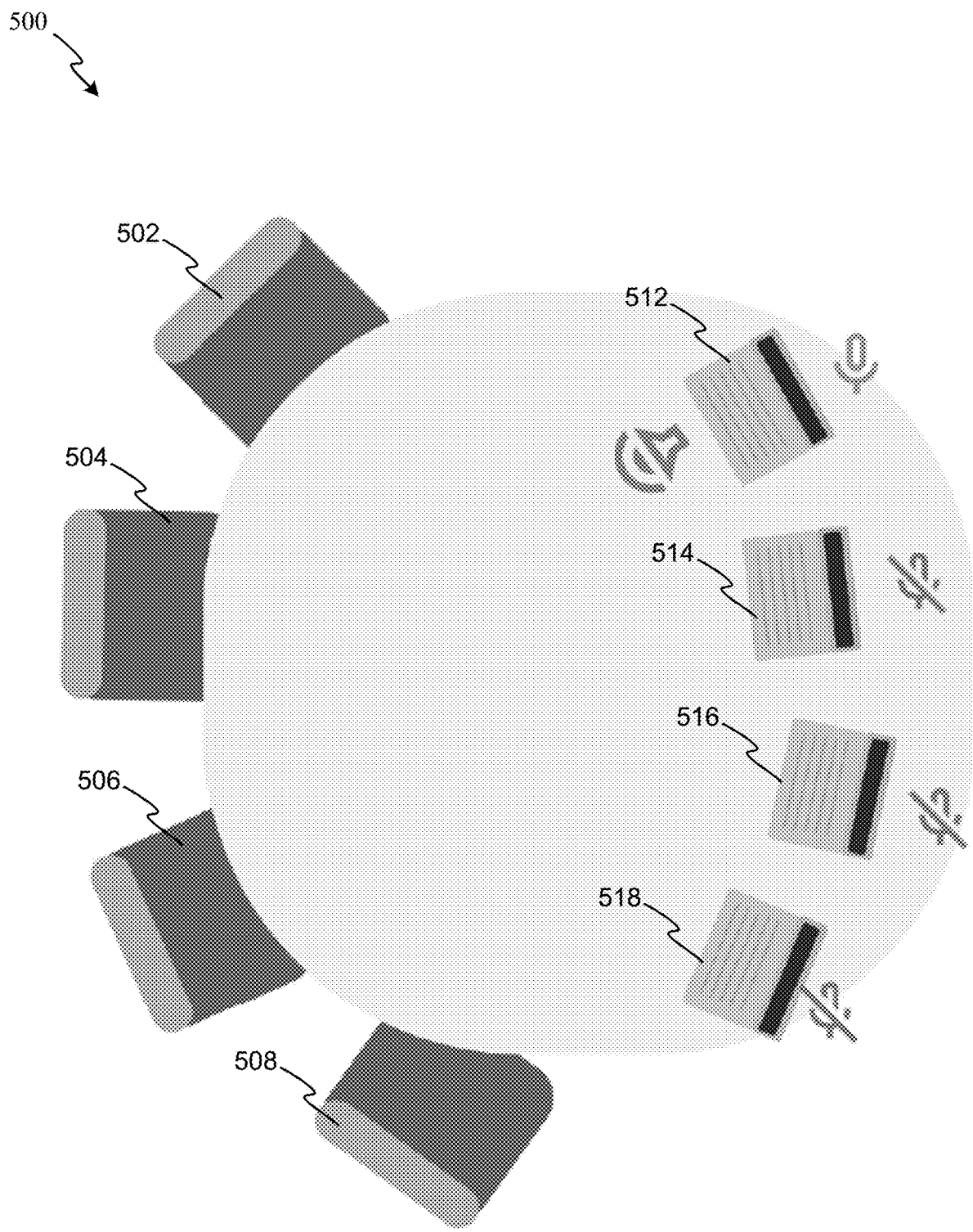
FIG. 5 is a diagram showing an example of a meeting room, in accordance with implementations of the present disclosure.

FIG. 5 is a diagram 500 showing an example of a meeting room, in accordance with some implementations. The meeting room can include four in-room participants 502-508 and four in-room client device 512-518. Each in-room client device 512-518 can be pinned to a respective remote client device (not shown). In diagram 500, a remote participant whose remote client device is pinned to in-room client device 512 is speaking. As such, the speakers (and, in some implementations, the microphones) coupled to in-room client device 512 are enabled, while the speakers and/or microphones coupled in-room client devices 514-518 are disabled. This allows in-room participants 502-508 to focus their attention on the speaking remote participant.

Figure 6:
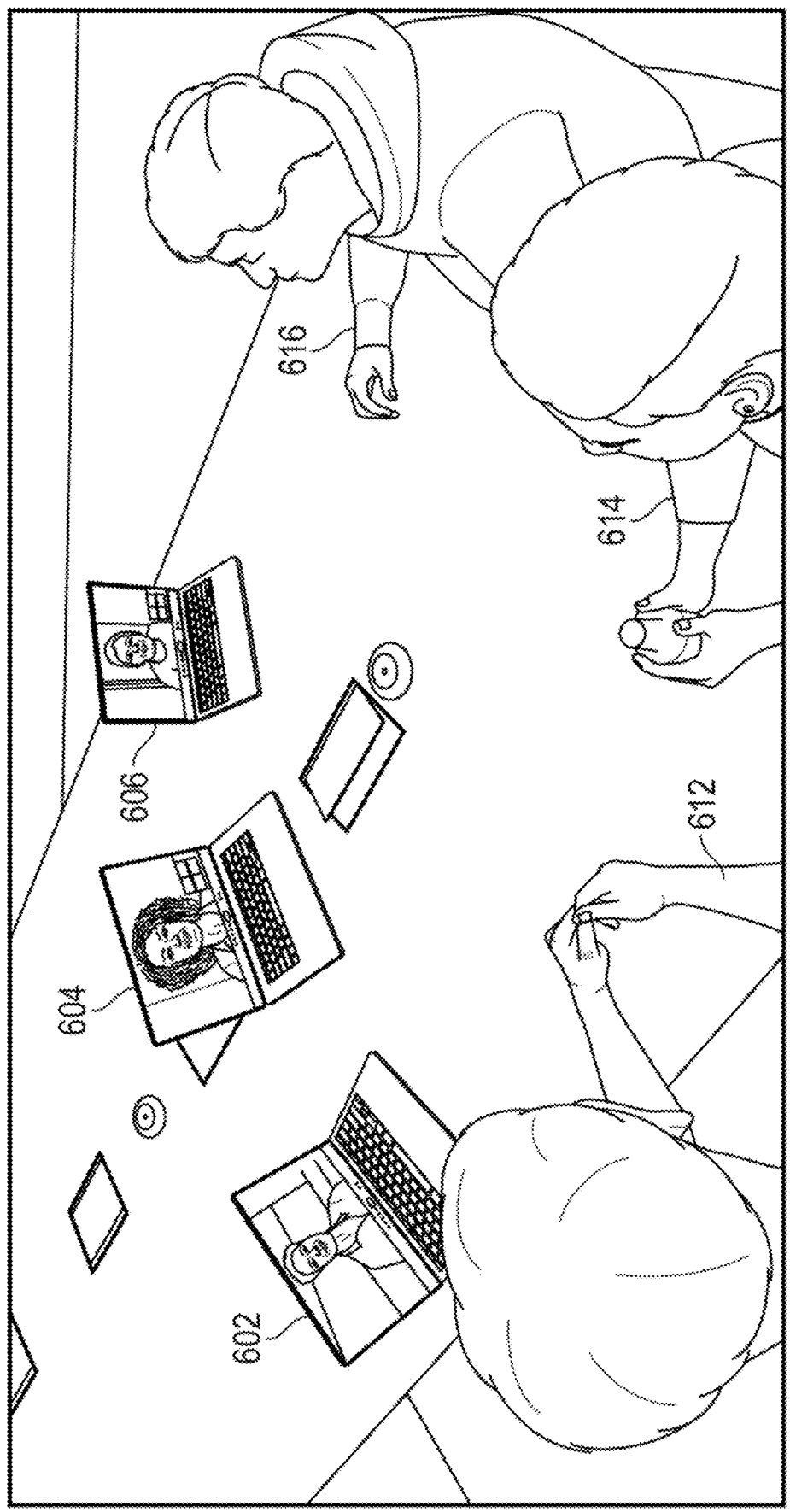
FIG. 6 is an image illustrating a hybrid meeting, in accordance with implementations of the present disclosure.

FIG. 6 is an image illustrating a hybrid meeting, in accordance with implementation of the present disclosure. As shown, three in-room client devices 602-606 are set up on a table in the meeting room. Each in-room client device 602-606 is pinned to a respective remote client device. Each in-room client device presents, on their respective UIs, a video stream associated with a remote participant. Three in-room participants 612-616 are also present at the hybrid meeting where the three in-room participants are located in the meeting room. The in-room client devices can be placed in a spatial arrangement, such as in an arc on a table. This allows in-room participants 612-616 to naturally direct their attention to the active speaker regardless of whether the active speaker is in the meeting room or remote.

Figure 7:
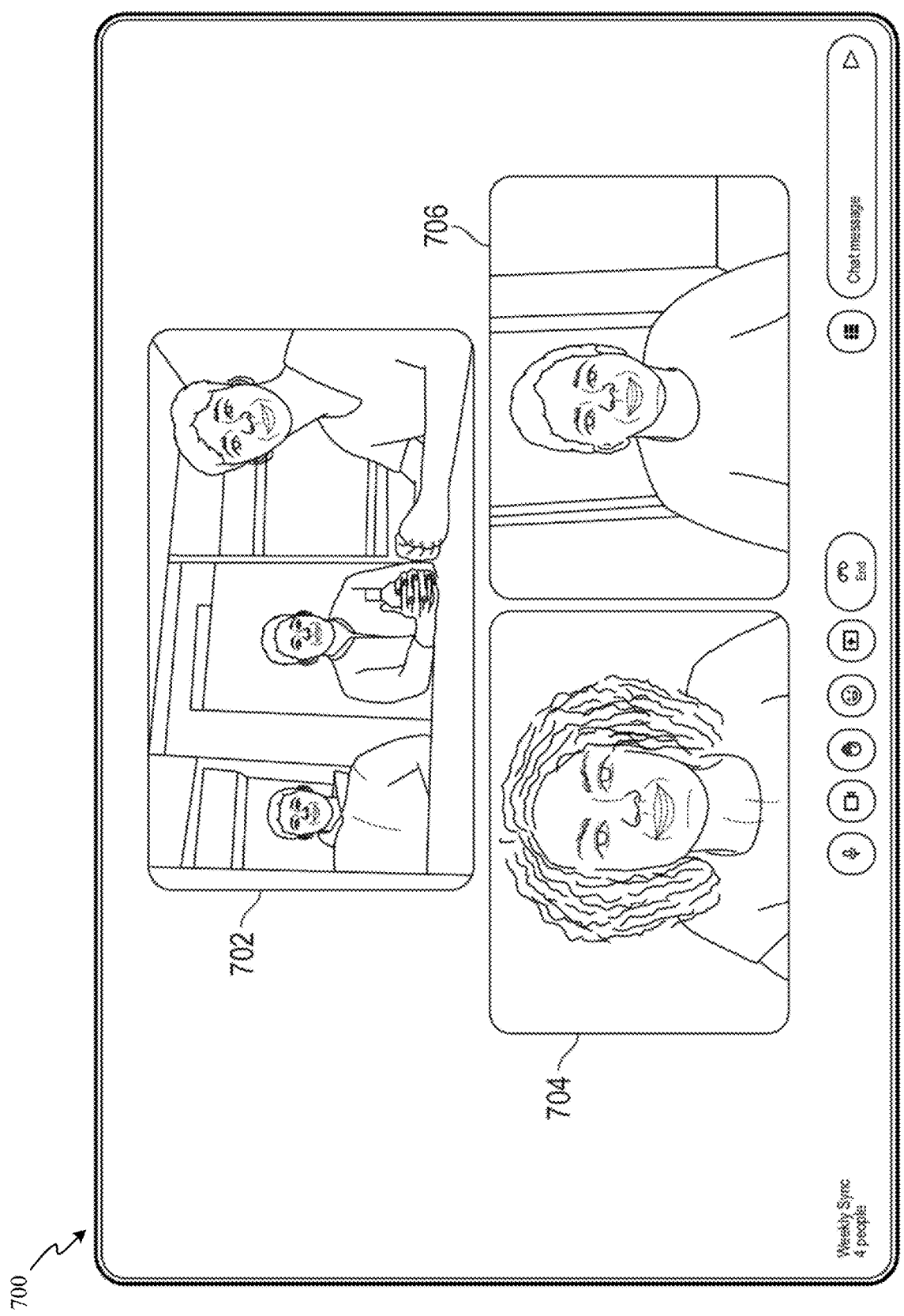
FIG. 7 illustrates an example user interface of a remote client device, in accordance with some implementations of the present disclosure.

FIG. 7 illustrates an example UI 700 of a remote client device, in accordance with some implementations of the present disclosure. The UI 700 can be generated by the video conference manager 122 of FIG. 1 for presentation at a remote client device (e.g., client devices 102A-102N, 104, remote client device 210A-210C). Accordingly, the UI 700 can be generated by one or more processing devices of the server 130 of FIG. 1. As illustrated, the UI provides, for presentation to the user, the video stream 702 from the in-room client device pinned to their remote client device, as well as the video streams 704, 706 from the other remote participants.

Figure 8:
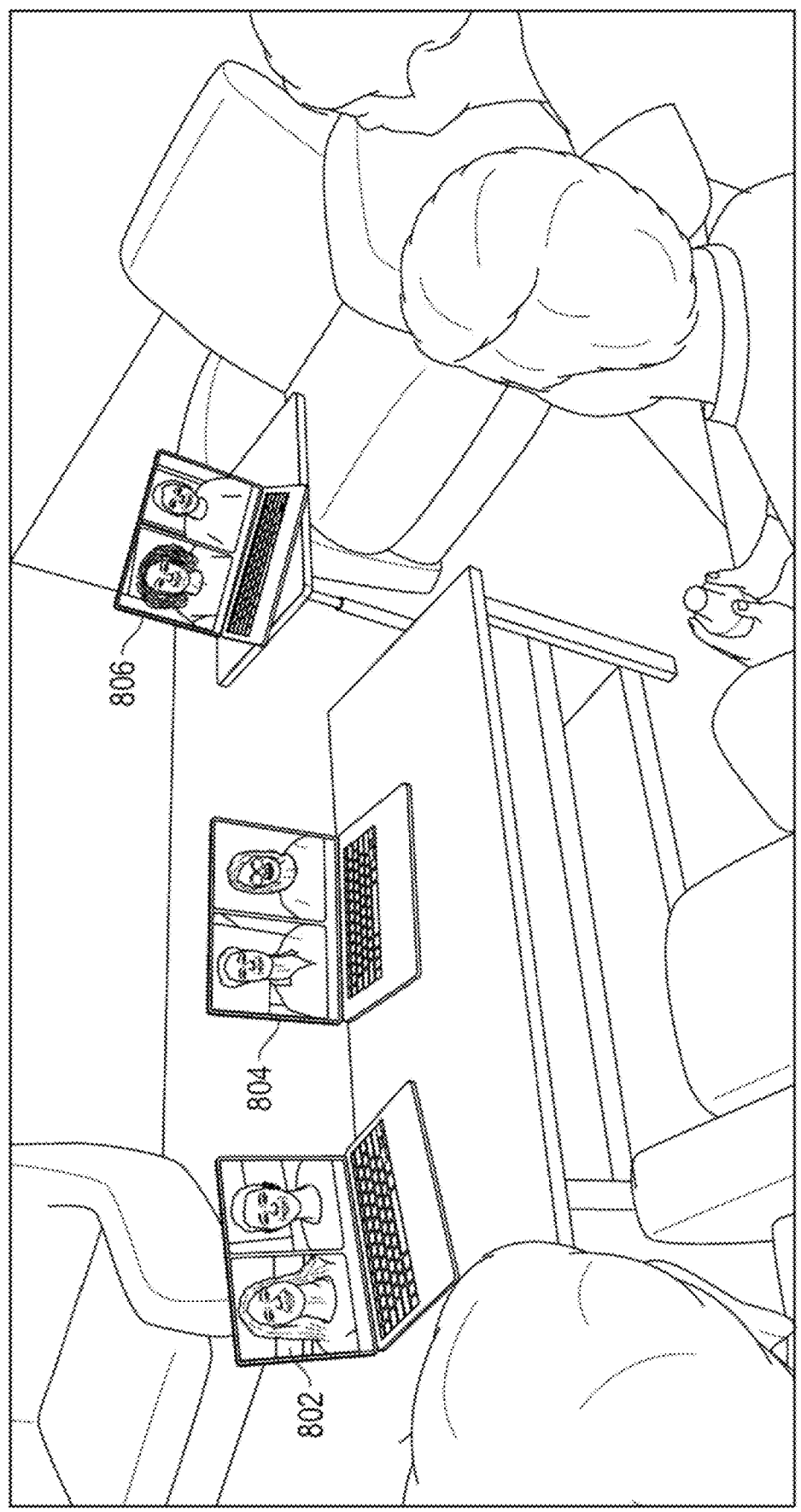
FIG. 8 is an image illustrating a hybrid meeting, in accordance with implementation of the present disclosure.

FIG. 8 is an image illustrating a hybrid meeting, in accordance with implementation of the present disclosure. As shown, three in-room client devices 802-806 are set up on multiple tables in the meeting room. Each in-room client device 802-806 is pinned to two respective remote client devices. Each in-room client device 802-806 presents, on their respective UIs, two remote participants. Three in-room participants are also present at the hybrid meeting, where the three in-room participants are located in the meeting room. The in-room client devices can be placed in a spatial arrangement resembling to allows in-room participants to naturally direct their attention to the active speaker.

Figure 9:
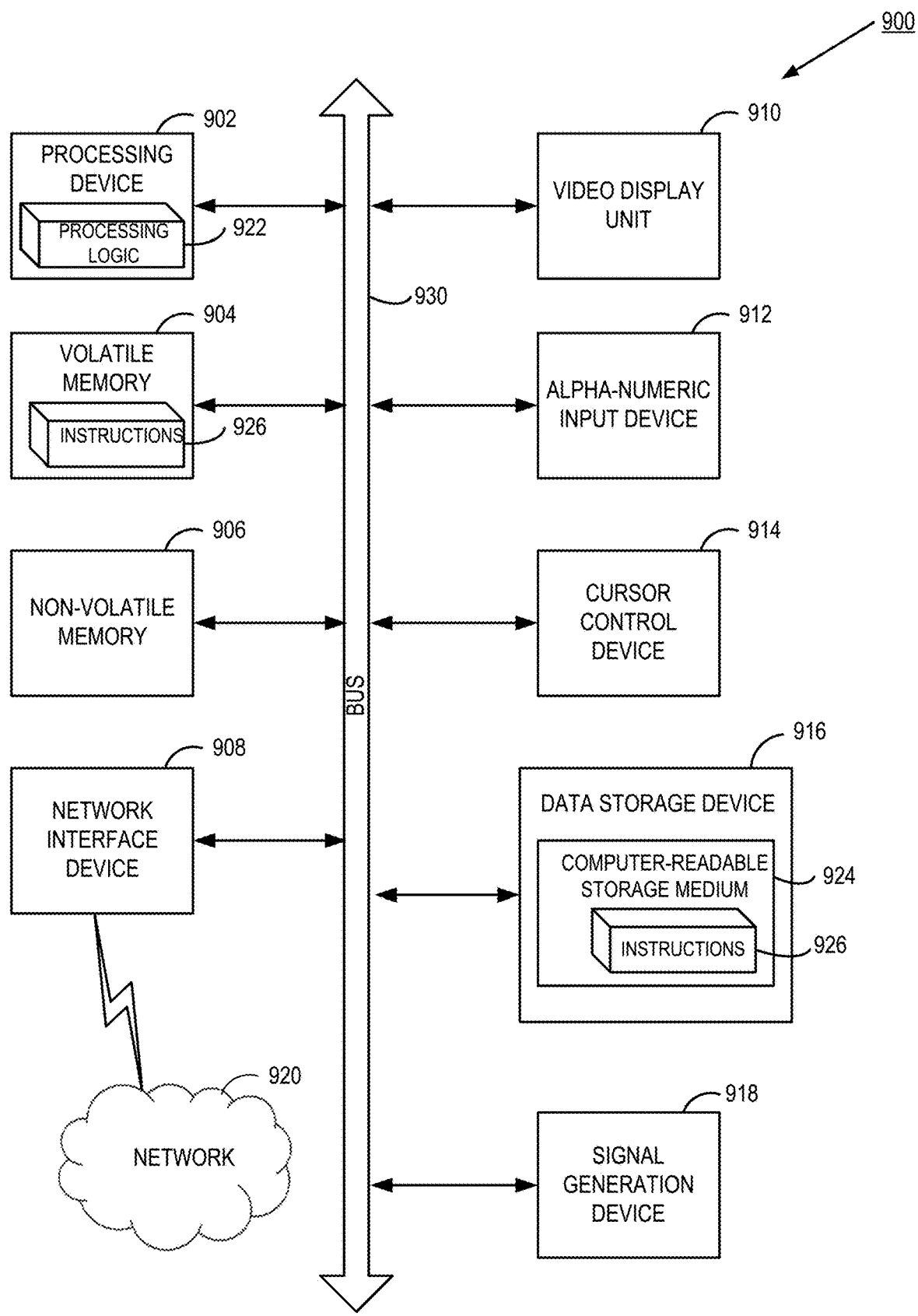
FIG. 9 is a block diagram illustrating an exemplary computer system, in accordance with implementations of the present disclosure.

FIG. 9 is a block diagram illustrating an exemplary computer system, in accordance with implementations of the present disclosure. The computer system 900 can be the server 130 or client devices 102A-N, 104 in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processing device (processor) 902, a main memory 904 (e.g., read-only memory (ROM), flash memory, dynamic random access memory (DRAM) such as synchronous DRAM (SDRAM), double data rate (DDR SDRAM), or DRAM (RDRAM), etc.), a static memory 906 (e.g., flash memory, static random access memory (SRAM), etc.), and a data storage device 918, which communicate with each other via a bus 940.

Processor (processing device) 902 represents one or more general-purpose processing devices such as a microprocessor, central processing unit, or the like. More particularly, the processor 902 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 can also be one or more special-purpose processing devices such as an application specific integrated circuit (ASIC), a field programmable gate array (FPGA), a digital signal processor (DSP), network processor, or the like. The processor 902 is configured to execute instructions 905 (e.g., for determining a best-frame position and generating deviation alerts) for performing the operations discussed herein.

The computer system 900 can further include a network interface device 908. The computer system 900 also can include a video display unit 910 (e.g., a liquid crystal display (LCD) or a cathode ray tube (CRT)), an input device 912 (e.g., a keyboard, and alphanumeric keyboard, a motion sensing input device, touch screen), a cursor control device 914 (e.g., a mouse), and a signal generation device 920 (e.g., a speaker).

The data storage device 918 can include a non-transitory machine-readable storage medium 924 (also computer-readable storage medium) on which is stored one or more sets of instructions 905 (e.g., for determining a best-frame position and generating deviation alerts) embodying any one or more of the methodologies or functions described herein. The instructions can also reside, completely or at least partially, within the main memory 904 and/or within the processor 902 during execution thereof by the computer system 900, the main memory 904 and the processor 902 also constituting machine-readable storage media. The instructions can further be transmitted or received over a network 930 via the network interface device 908.

In one implementation, the instructions 905 include instructions for determining visual items for presentation in a user interface of a video conference. While the computer-readable storage medium 924 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
   assigning, by a processor, each client device of a first set of client devices to a respective client device of a second set of client devices, wherein a list of client devices from the second set of client devices is presented on a first client device of the first set of client devices, the list of client devices being available for the first client device to be assigned to;
   providing, for presentation on each of the second set of client devices, a respective user interface comprising a region to display a video stream received from the corresponding assigned client device of the first set of client devices;
   detecting audio input from the first client device, wherein the first client device is assigned to a second client device of the second set of client devices;
   enabling a first speaker coupled to the second client device; and
   disabling a second speaker coupled to a third client device of the second set of client devices.

2. The method of claim 1, further comprising:
   detecting audio input from the third client device;
   enabling communication via a first microphone coupled to the third client device; and
   disabling the first speaker.

3. The method of claim 1, further comprising:
   detecting audio input from a fourth client device of the first set of client devices, wherein the fourth client device is assigned to the third client device;
   enabling the second speaker; and
   disabling the first speaker and a first microphone coupled to the first client device.

4. The method of claim 1, further comprising:
   disabling notifications on the second client device.

5. The method of claim 1, further comprising:
   assigning a fourth client device of the first set of client devices to the second client device to present an audio stream obtained from the fourth client device.

6. The method of claim 5, wherein assigning the fourth client device is performed in response to determining at least one of a pixel size or a display device size of the second client device.

7. A system comprising:
   a memory device; and
   a processing device coupled to the memory device, the processing device to perform operations comprising:
      assigning each client device of a first set of client devices to a respective client device of a second set of client devices, wherein a list of client devices from the second set of client devices is presented on a first client device of the first set of client devices, the list of client devices being available for the first client device to be assigned to;
      providing, for presentation on each of the second set of client devices, a respective user interface comprising a region to display a video stream received from the corresponding assigned client device of the first set of client devices;
      detecting audio input from the first client device, wherein the first client device is assigned to a second client device of the second set of client devices;
      enabling a first speaker coupled to the second client device; and
      disabling a second speaker coupled to a third client device of the second set of client devices.

8. The system of claim 7, wherein the operations further comprise:
   detecting audio input from the third client device;
   enabling communication via a first microphone coupled to the third device; and
   disabling the first speaker.

9. The system of claim 7, wherein the operations further comprise:
   detecting audio input from a fourth client device of the first set of client devices, wherein the fourth client device is assigned to the third client device;
   enabling the second speaker; and
   disabling the first speaker and a first microphone coupled to the first client device.

10. The system of claim 7, wherein the operations further comprise:
    disabling notifications on the second client device.

11. The system of claim 7, wherein the operations further comprise:
    assigning a fourth client device of the first set of client devices to the second client device to present an audio stream obtained from the fourth client device.

12. The system of claim 11, wherein assigning the fourth client device is performed in response to determining at least one of a pixel size or a display device size of the second client device.

13. A method comprising:
    detecting that a user of a first remote client device of a plurality of remote client devices is joining a video conference;
    responsive to receiving, from the first remote client device, a selection of a first in-room client device of a plurality of in-room client devices located in a meeting room, assigning the first remote client device to the first in-room client device of the plurality of in-room client devices located in the meeting room;
    causing presentation of a first user interface on the first in-room client device, the first user interface to display a video stream generated by the first remote client device without displaying a video stream generated by any other remote client device of the plurality of remote client devices; and
    causing presentation of a second user interface on the first remote client device, the second user interface to display a video stream generated by the first in-room client device and a video stream generated by each other remote client device of the plurality of remote client devices, without displaying a video stream generated by any other in-room client device of the plurality of in-room client devices.

14. The method of claim 13, further comprising:
    detecting audio input from the first remote client device;
    enabling a first speaker coupled to the first in-room client device.

15. The method of claim 14, further comprising:
    detecting audio input from a second remote client device of the plurality of remote client devices;
    enabling a second speaker coupled to a second in-room client device of the plurality of in-room client devices; and
    disabling the first speaker.

16. The method of claim 13, further comprising:
    disabling notifications on the first in-room client device.

17. The method of claim 13, further comprising:
    sending configuration data to the first remote client device and the first in-room client device, wherein the configuration data enables the first remote client device and the first in-room client device to communicate directly.

* * * * *